Sept. 5, 1967 T. DUGLE ETAL 3,339,855

COMMINUTION MACHINE FOR SOLID PLIABLE MATERIAL

Original Filed May 23, 1963

INVENTORS
THOMAS DUGLE,
GEORGE A. LENSKY &
ROLAND W. WAGNER

BY David P. Allen

ATTORNEY

Fig. 2

Sept. 5, 1967 T. DUGLE ETAL 3,339,855
COMMINUTION MACHINE FOR SOLID PLIABLE MATERIAL
Original Filed May 23, 1963 9 Sheets-Sheet 4

FIG.4

INVENTORS
THOMAS DUGLE,
GEORGE A. LENSKY &
ROLAND W. WAGNER
BY
ATTORNEY

Sept. 5, 1967   T. DUGLE ETAL   3,339,855
COMMINUTION MACHINE FOR SOLID PLIABLE MATERIAL
Original Filed May 23, 1963   9 Sheets-Sheet 9

INVENTORS
THOMAS DUGLE,
GEORGE A. LENSKY &
ROLAND W. WAGNER

ATTORNEY

United States Patent Office 3,339,855
Patented Sept. 5, 1967

3,339,855
COMMINUTION MACHINE FOR SOLID
PLIABLE MATERIAL
Thomas Dugle, Cincinnati, Ohio, George A. Lensky, Grand Rapids, Mich., and Roland W. Wagner, Cincinnati, Ohio, assignors to Continental Oil Company, Ponca City, Okla., a corporation of Delaware
Original application May 23, 1963, Ser. No. 282,674, now Patent No. 3,211,370, dated Oct. 12, 1965. Divided and this application Apr. 1, 1965, Ser. No. 444,580
2 Claims. (Cl. 241—280)

This is a divisional application of the co-pending application of the present inventors, entitled, "Comminution Machine for Solid Pliable Material," Ser. No. 282,674, filed May 23, 1963, now U.S. Patent No. 3,211,370.

The present invention relates to comminution, and more particularly, but not by way of limitation, relates to a machine for cutting pliable material such as aluminum into small chips having a high surface area-to-volume ratio, and for performing the comminution under a controlled atmosphere.

There are a large number of applications where small particles of metal having a high surface area-to-volume ratio are highly desirable. This is particularly true where the metal particles are to be used in a chemical reaction in which an increased reaction rate can be attained by increasing the available metal surface area. For example, the commercial manufacture of aluminum alkyls and Grignard reagents requires metal particles having high surface area-to-volume ratios for greatest operating efficiency. Also, in the manufacture of aluminum paint pigments, the smaller the particle size of aluminum fed to the ball milling step, the lower the cost of manufacturing a given grade of pigment.

In those cases where the metal is to be used in a chemical reaction, it is usually desirable, if not absolutely essential, to prevent air and/or moisture from contacting the newly created metal surface. This is particularly true of aluminum because aluminum will almost instantaneously be oxidized by the atmosphere to produce an aluminum oxide film which would of course greatly retard the chemical reaction. Also, many pure metals, such as aluminum, are difficult to machine into small chips having high surface area-to-volume ratios because the metal is pliable and does not readily break into chips. Consequently, traces of other metals are often added in order to improve the chip breaking characteristic of the pure metal. In many cases, however, especially where the metal particles are to be used for chemical processes, the addition of even trace amounts of other metals is undesirable. Further, the level of metal additives required to obtain the necessary chip breaking characteristics would frequently be uneconomical.

The present invention contemplates a novel comminuting machine for producing a complete cutting action rather than relying upon chipping action, so that a pliable, solid material such as pure aluminum can be cut into a large plurality of relatively small particles having a high surface area-to-volume ratio. The novel comminuting machine comprises, in general, at least one rotary cutting element having an axis of rotation and at least one cutting blade thereon, and means operatively connected to the rotary cutting element for simultaneously rotating the cutting element about its axis of rotation and displacing the axis of rotation along a path so that solid stock moved into the path of the cutting element will be cut into a plurality of thin, flake-like particles. The present invention also contemplates novel mechanisms for simultaneously rotating and translating the cutting element along the path, novel means for automatically feeding solid stock into the path of the cutting element, means for controlling the atmosphere in the cutting zone so as to eliminate the danger of oxidation of the freshly created surfaces, means for continually cooling and lubricating the cutting element as well as for removing the freshly cut flakes from the comminution zone, and an overall system for cutting the material into the flakes and transporting the flakes to a chemical reaction vessel or other processing apparatus under a continually controlled atmosphere.

Therefore, it is an important object of the present invention to provide an improved comminuting machine for cutting a pliable, solid material into a plurality of thin, flake-like particles having a high surface area-to-volume ratio.

Another object of the present invention is to provide a comminuting machine for cutting, rather than breaking, a pliable, solid material such as aluminum.

Yet another object of the present invention is to provide a mechanism for oscillating a rotary cutting element along an arcuate path.

Another object of the present invention is to provide a mechanism for moving a plurality of rotary cutting elements along a circular path.

Still another object of the present invention is to provide a novel comminuting machine of the type described wherein the atmosphere in the comminution zone can be controlled so as to prevent oxidation or other contamination of the particles.

Yet another object of the present invention is to provide a comminuting machine of the type described wherein a liquid and gas stream can be introduced for simultaneously controlling the atmosphere under which the cutting operation takes place, cooling, lubricating and cleaning the cutting element, and for removing the cut particles from the comminution zone.

Still another object of the present invention is to provide a system for cutting solid stock into a plurality of small particles and transporting the particles to a reaction vessel under a controlled atmosphere.

A still further object of the present invention is to provide an improved rotary cutting element for use in a comminuting machine of the type described.

Yet another object of the present invention is to provide a comminuting machine of the type described which can be easily and economically constructed, and which will have a long, trouble-free, and economical operating life.

Many additional objects and advantages of the present invention will be evident to those skilled in the art from the following detailed description and drawings wherein.

Figure 1:
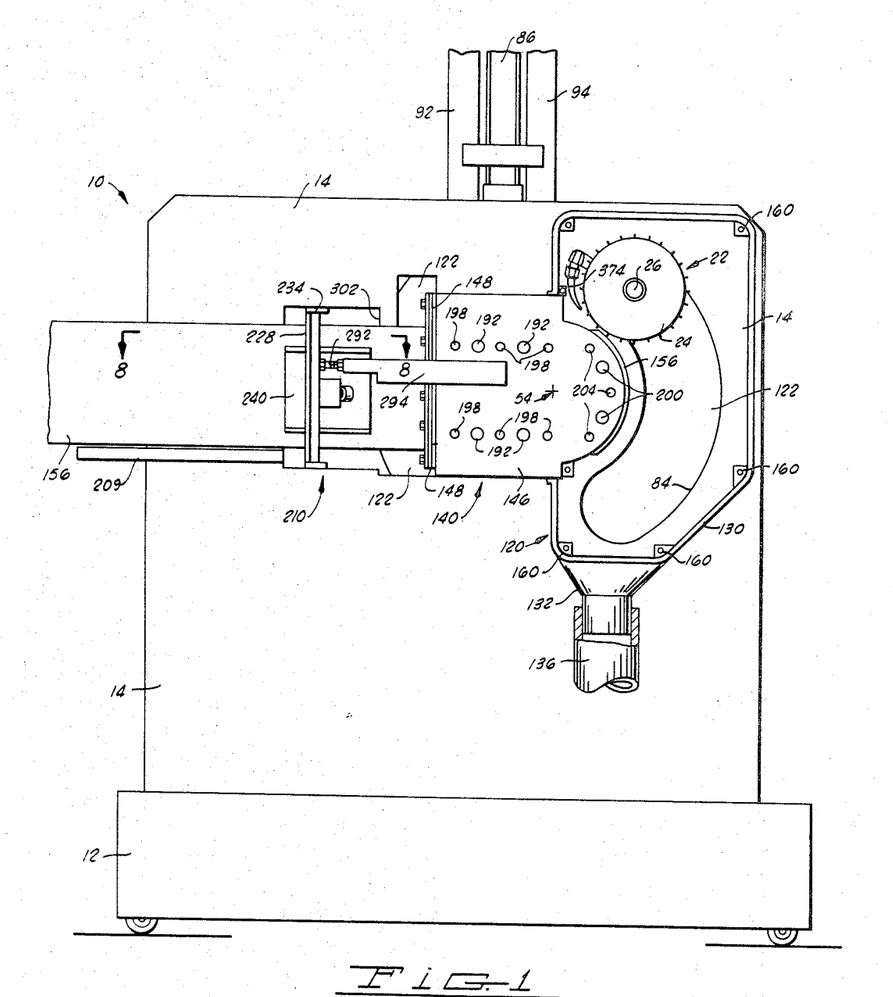
FIG. 1 is a front elevation of a comminuting machine constructed in accordance with the present invention with the cover plate for the comminution zone removed and the oscillating arm in the "up" position.
Figure 3:
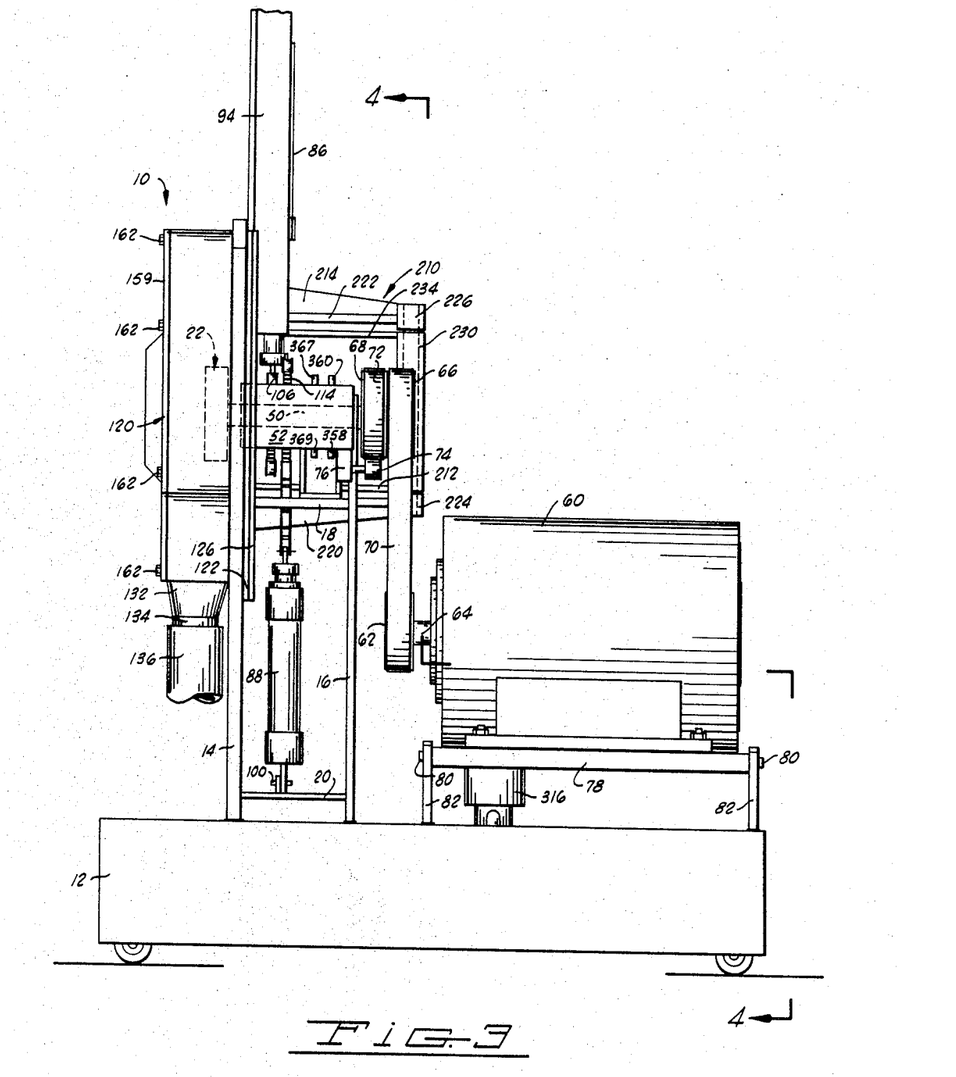
FIG. 3 is a view taken from the right-hand side of the comminuting machine of FIG. 1 with the oscillating arm in a horizontal position.
Figure 4:
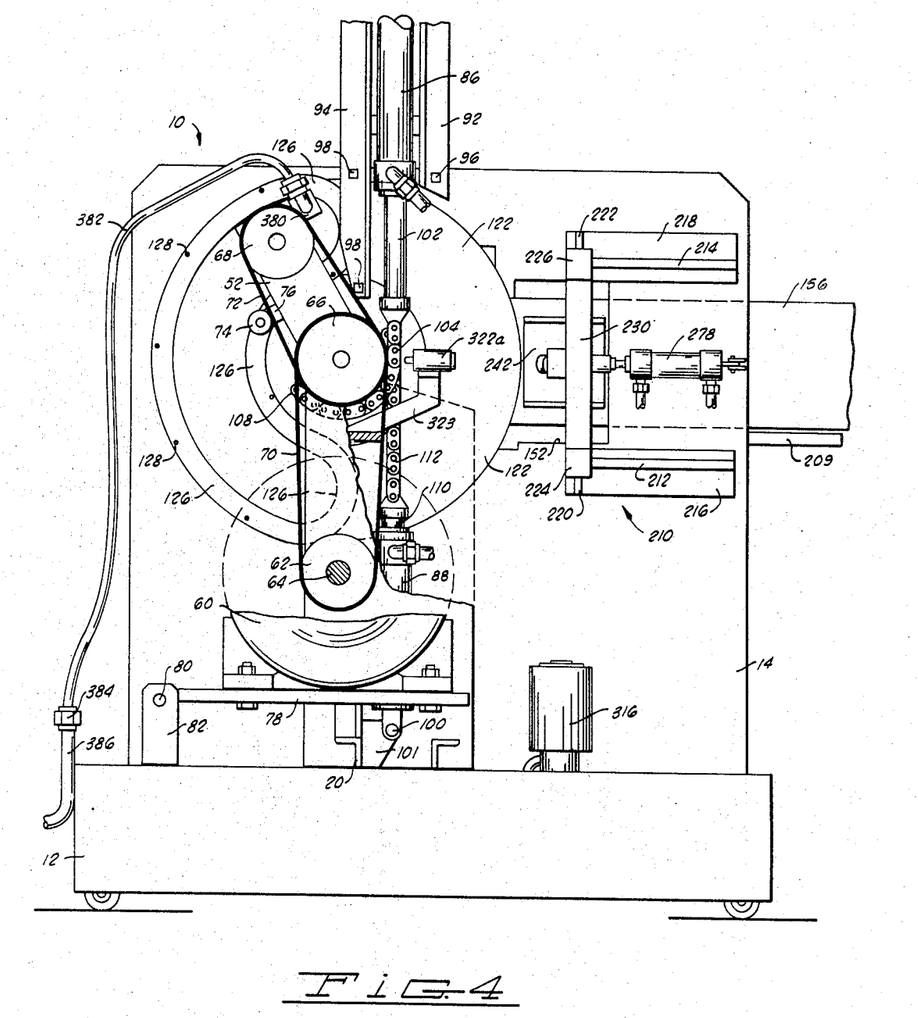
FIG. 4 is a sectional view taken substantially on lines 4—4 of FIG. 3 with a support plate broken away to better show other details of construction and with the oscillating arm shown in the "up" position.

Referring now to the drawings, a comminution machine constructed in accordance with the present invention is indicated generally by the reference numeral 10. The comminution machine 10 comprises a base portion 12 which may be constructed in any suitable manner, but preferably also has four side walls and a top which form a fluid reservoir for the hydraulic actuating system which will hereafter be described. A first upright support plate 14 is connected to the base member 12 and is conveniently disposed in a vertical position, as best seen in the side view of FIG. 3. The first or front upright support plate 14 may be generally square in configuration, as best seen in FIGS. 1 and 4, and may be fabricated from a steel plate approximately one inch in thickness. A second or rear vertical support plate 16 is disposed substantially parallel to the first vertical support plate 14 and is also connected for support to the base member 12. An upper horizontal brace plate 18 interconnects the midpoints of the upright plates 14 and 16 and a lower horizontal brace plate 20 interconnects the lower ends of the upright plates 14 and 16. In addition to bracing the upright plates 14 and 16, the brace plates 18 and 20 also serve as mounting brackets for components presently to be described.

Figure 11:
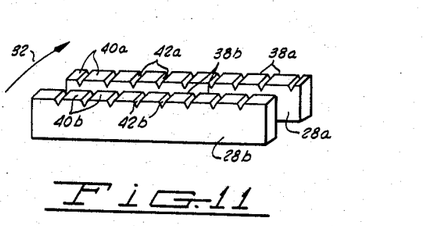
FIG. 11 is a perspective view of two adjacent cutting blades of the cutting element of FIG. 10.

A rotary cutting element indicated generally by the reference numeral 22 is comprised of a disc-shaped body 24 having an axis of rotation 26. The cutting element 22 may conveniently be approximately eight inches in diameter and approximately one and one-half inches in thickness and has a plurality of cutter blades 28 which are circumferentially spaced around the periphery of the cutting element 22 and are preferably disposed substantially parallel to the axis of rotation 26. The cutting blades 28a and 28b may be formed by machining the body 24, but preferably are comprised of elongated inserts formed either as shown in FIG. 11 or FIG. 12, as will presently be described.

Figure 10:
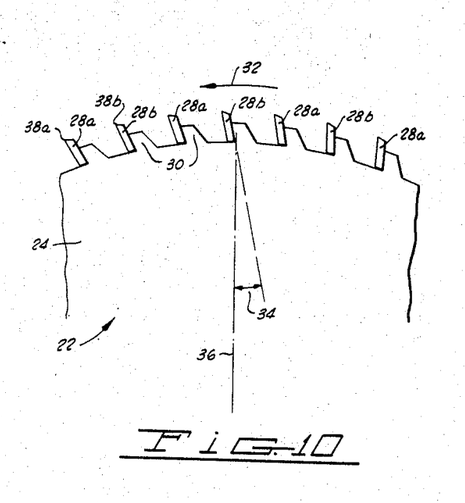
FIG. 10 is a side view of a peripheral segment of the rotating cutting element of the comminuting machine of FIG. 1.

The blades 28a and 28b may conveniently be fabricated from tungsten carbide or other suitable cutting material and may be brazed or otherwise connected to projections 30 extending from the body 24 as best seen in FIG. 10. The blades 28 are preferably tilted forward in the direction of rotation, indicated by the arrow 32, at an angle 34 with a radial line 36 extending from the axis of rotation of the cutting element 22. The cutting blades 28a and 28b have cutting edges 38a and 38b, respectively, which are divided into a plurality of slightly spaced teeth 40a and 40b, respectively, as can be seen in FIG. 11, by a plurality of transversely extending grooves 42a and 42b. It will be noted that the teeth 40a are staggered from the teeth 40b so that the teeth 40a cover the grooves 42b and the teeth 40b cover the grooves 42a and thereby provide complete cutting of solid stock, as will hereafter be described.

Figure 12:
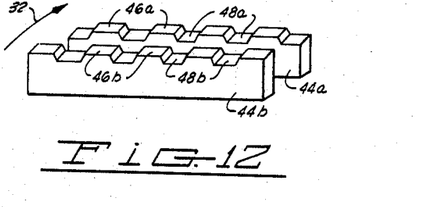
FIG. 12 is a perspective view of two other adjacent cutting blades which may be used on the cutting element of FIG. 10 instead of the cutting blades of FIG. 11.

Alternatively, the cutting blades on the cutting element 22 may be formed substantially as shown in FIG. 12 wherein the cutting blades are designated by the reference numerals 44a and 44b. It will be noted that the teeth 46a are staggered from the teeth 46b which are spaced almost one tooth width apart to form spaces 48a and 48b, respectively. Thus it will be noted that the teeth 46a cover the spaces 48b and the teeth 46b cover the spaces 48a to provide complete cutting of solid stock, as will hereafter be described in greater detail.

Figure 5:
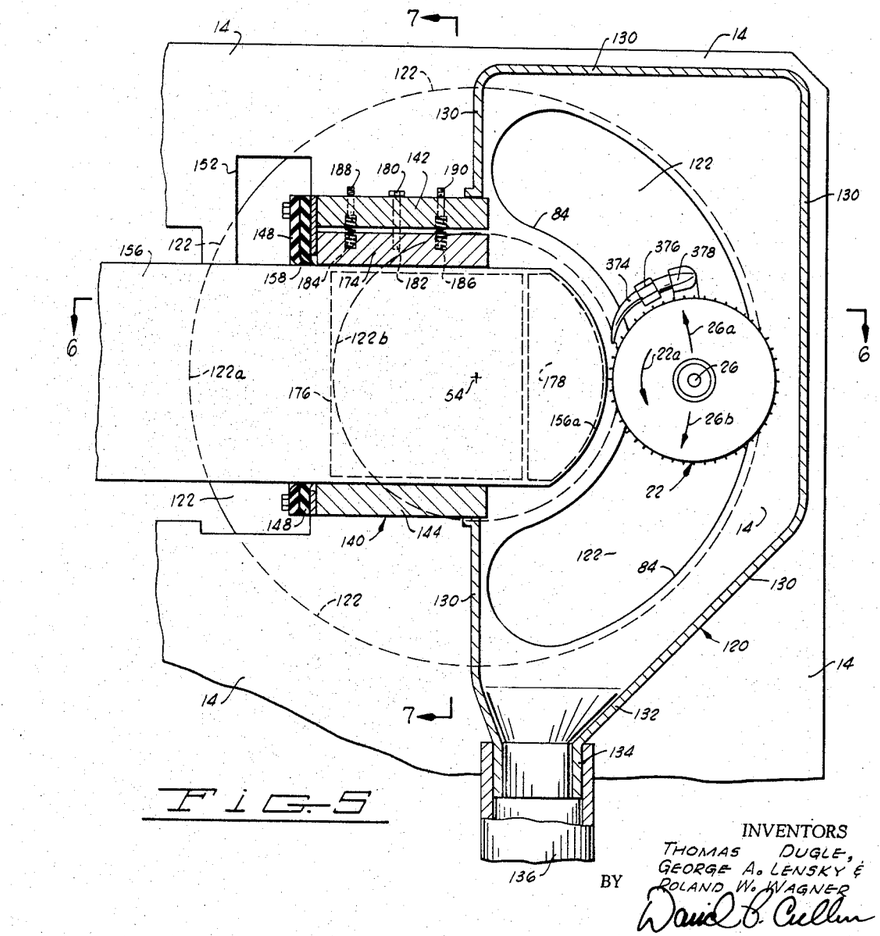
FIG. 5 is a sectional view taken substantially on lines 5—5 of FIG. 2 or of FIG. 6, with the oscillating arm in horizontal position.

The cutting element 22 is rotated about the axis of rotation 26 and the axis of rotation 26 is translated through an arcuate path by novel apparatus which will now be described. The rotating cutting element 22 is mounted on a shaft 50 which of course coincides with the axis of rotation 26 and which may be seen in dotted outline in FIGS. 2 and 3. The shaft 50 is journaled for rotation in an arm member 52, as can best be seen in FIGS. 2, 3 and 6. The arm member 52 is pivotally connected between the upright support plates 14 and 16 for oscillatory movement about an axis located at 54, as shown in FIGS. 1, 4 and 5. The arm member 52 may be journaled in the upright plate 14 by an integrally formed front stub axle portion 56 and in the upright support plate 16 by a journal pin 58 shown only in FIG. 2. The journal pin 58 is journaled in a suitable bearing means (not illustrated) in the rear upright support plate 16 and extends further rearwardly to journal a double sheave presently to be described. Thus it will be noted that the arm member 52 can be oscillated around the pivot point 54. In order to permit oscillatory translation of the cutting element 22 along an arcuate path, an arcuate slot 84 is provided in the support plate 14 for receiving the shaft 50, as can best be seen in FIGS. 1, 5 and 6.

The cutting element 22 is rotated about its axis of rotation 26 by means of an electric motor 60 and a belt drive train comprising a sheave 62 which is splined on the drive shaft 64 of the electric motor 60, a double sheave 66 which is journaled by suitable bearing means (not illustrated) on the journal pin 58, and a sheave 68 which is splined to the rear end of the shaft 50. A timing belt 70 extends around the sheave 62 and around the outer sheave of the double sheave 66. A second timing belt 72 extends around the inner sheave of the double sheave 66 and around the sheave 68. Since the journal pin 58 lies on the axis of rotation 54 of the arm member 52, it will be evident that rotary motion can be transmitted from the shaft 64 of the electric motor 60 through the belt 70, the double sheave 66, the belt 72, the sheave 68 and the shaft 50 to the cutting element 22 as the arm member 52 oscillates about the axis 54, as will presently be described. The belt 72 may be tensioned by an idler roller 74 which may be journaled by suitable bracket means 76 (see FIG. 4) connected to the arm member 52. The belt 70 may be tensioned by the weight of the electric motor 60 which is preferably connected to a base plate 78 which is pivotally connected by a pin 80 to a bracket 82, which in turn is connected to the base member 12.

Figure 2:
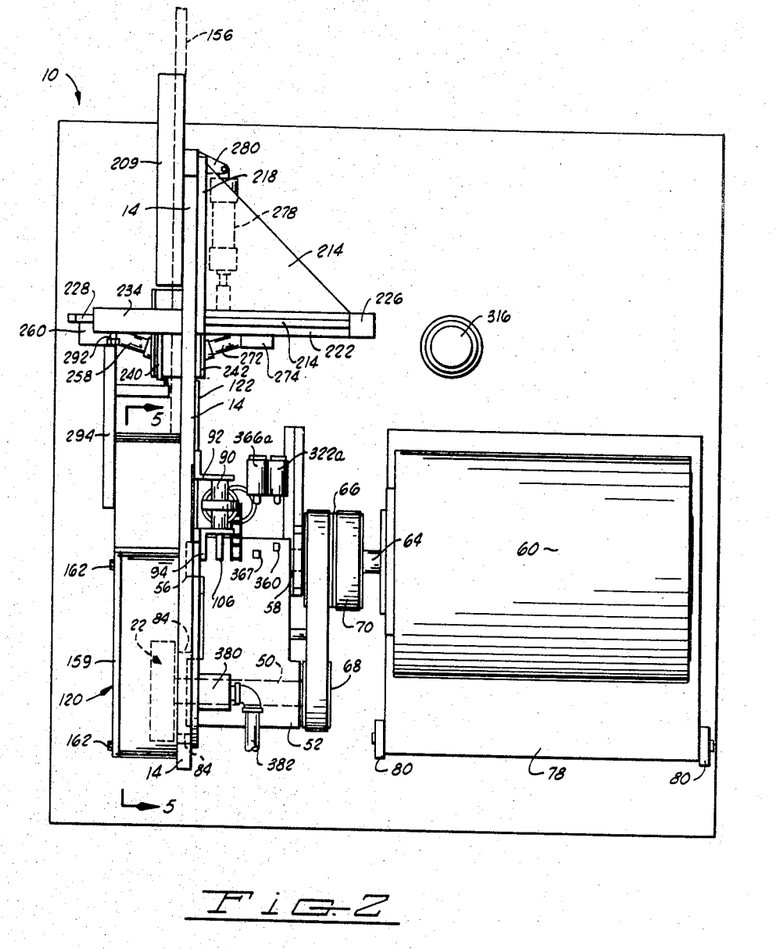
FIG. 2 is a plan view of the comminuting machine of FIG. 1 with the oscillating arm in a horizontal position.

The mechanism for oscillating the arm member 52 and therefore the cutting element 22 is comprised of an upper hydraulic cylinder 86 and a lower hydraulic cylinder 88. The upper end of the upper hydraulic cylinder 86 may be connected to a pin 90 extending between angle iron supports 92 and 94, as best seen in FIG. 2. The angle iron supports 92 and 94 are connected to the support plate 14 by bolts 96 and 98, respectively. The lower end of the lower cylinder 88 may be connected by a pin 100 and bracket 101 to the lower brace plate 20 previously described, as best seen in FIGS. 3 and 4. The piston rod 102 of the hydraulic cylinder 86 is connected to a downwardly extending length of chain 104 which passes around a semicircular sprocket 106 connected to the arm member 52 and is anchored at the point 108 on the sprocket. The piston rod 110 of the lower hydraulic cylinder 88 is connected to an upwardly extending length of chain 112 which extends around another semicircular chain sprocket 114. Thus when the piston rod 102 is moved upwardly by introducing hydraulic fluid under pressure to the upper cylinder 86, as will hereafter be described in detail, the arm member 52 will be moved counterclockwise, when referring to FIG. 4, so that the cutting element 22 will be moved through a downstroke, or downwardly along the arcuate slot 84, when referring to FIG. 1. Then when hydraulic fluid is introduced to the lower cylinder 88 so as to move the piston rod 110 downwardly, the chain 112 will pivot the arm member 52 in a clockwise direction, when referring to FIG. 4, and thereby move the cutting element 22 through an upstroke, when referring to FIG. 1. The hydraulic circuitry by which this is accomplished will hereafter be described in detail.

Housing means for controlling the atmosphere around the cutting element 22 is indicated generally by the reference numeral 120. The back of the atmospheric control housing, when referring to FIG. 1, is formed by the plate 14 and a doughnut-shaped sealing plate 122 having outer and inner edges 122a and 122b, respectively, which covers the arcuately-shaped aperture 84. The doughnut-shaped plate 122 is shown in dotted outline in FIG. 5 and is disposed behind the plate 14, as can best be seen in FIG. 6. The doughnut-shaped plate 122 is apertured to receive a shaft 50 which drives the cutting element 22 and is rigidly connected to the outer end of the arm member 52 so as to be oscillated therewith. A resilient gasket 124 is disposed around the arcuate opening 84 and between the doughnut-shaped plate 122 and the front upright support plate 14. A clamping ring 126, corresponding in shape to the elongated arcuate slot 84, extends over the outer and inner edges 122a and 122b of the doughnut-shaped plate 122 around the entire periphery of the arcuate slot 84, as can best be seen in FIGS. 4 and 6. The clamping ring 126 may be connected to the main upright support plate 14 by bolts 128. Of course, the ends of the clamping ring 126 are not bolted to the plate 14 in order to permit the doughnut-shaped sealing plate 122 to slide freely between the clamping ring 126 and the gasket 124 as the arm member 52 is oscillated. Therefore, it will be noted that as the arm member 52 oscillates, the sealing plate 122 will continually be held against the resilient gasket 124 and provide substantially an airtight seal with the support plate 14.

The sides of the atmospheric control housing 120 are formed by a plate 130 which is bent into the configuration shown in FIGS. 1 and 5 and which is welded to the upright support plate 14. The bottom of the side wall plate 130 is tapered downwardly to form a funnel 132 which terminates in a circular conduit 134 which in turn may be inserted or otherwise connected to a conduit 136 leading to another part of the system, as will hereafter be described in greater detail.

Figure 6:
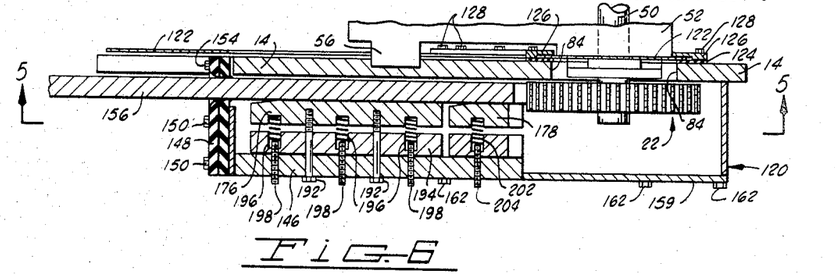
FIG. 6 is a sectional view taken substantially on lines 6—6 of FIG. 5.

A feed chamber, indicated generally by the reference numeral 140, forms a part of the left-hand side of the side wall plate 130, when referring to FIGS. 1 and 5. The feed chamber houses clamping means for holding feed stock, which will presently be described, and is comprised of a top and a bottom plate 142 and 144, respectively, which are connected to the upright support plate 14, and a front plate 146 which is connected to plates 142 and 144 by welding or other suitable means. A plurality of resilient sealing plates 148 are connected to the ends of the plates 142, 144 and 146 by suitable bolts 150, and, as can be seen in FIG. 6, also extend into an enlarged aperture in the support plate 14 and are connected to the plate 14 by bolts 154. The resilient sealing plates 148 are provided with elongated apertures which closely receive feed stock ingots 156 so as to maintain control of the atmosphere within the housing 120 as the feed stock ingots 156 are fed to the comminution zone, as will hereafter be described in greater detail. The atmospheric control housing 120 is completed by the cover plate 159 which can be seen in cross section in FIG. 6 and in full view in FIGS. 2 and 3. It will be noted that the cover plate 159 is removed in FIG. 1 and that threaded apertures 160 are provided at points around the interior of the side wall plate 130 for receiving the bolts 162 which are passed through the cover plate 159 to secure it in place.

Figures 7, 8, 9:
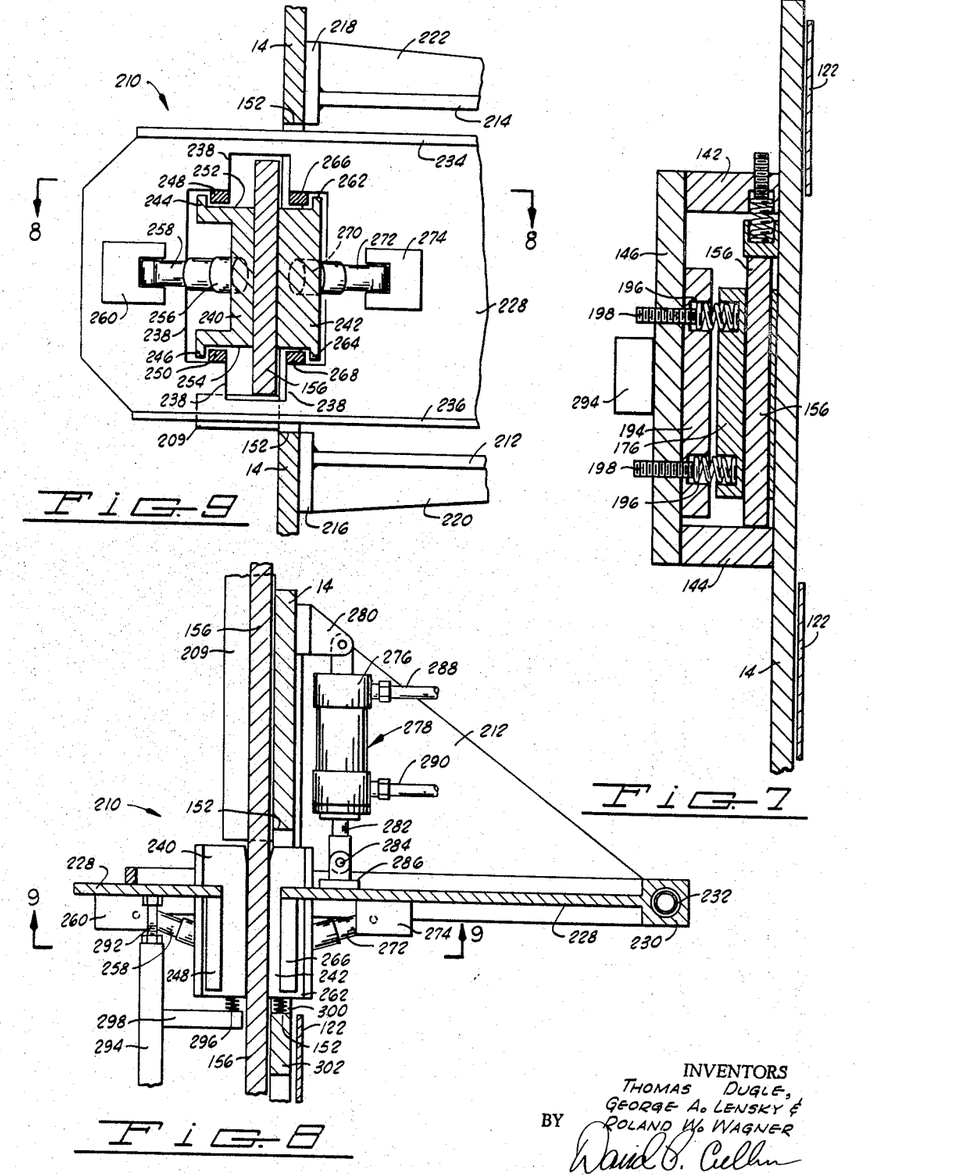
FIG. 7 is a sectional view taken substantially on lines 7—7 of FIG. 5.
FIG. 8 is a sectional view taken substantially on lines 8—8 of FIG. 1.
FIG. 9 is a sectional view taken substantially on lines 9—9 of FIG. 8.
Figure 15:
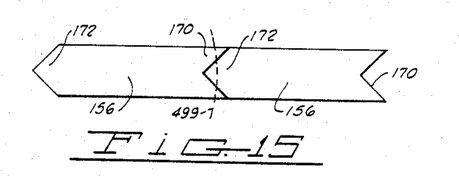
FIG. 15 is a schematic side view of two feed stock bars for feeding the comminuting machine of FIG. 1.

Referring now to FIGS. 5, 6 and 7, it will be noted that the solid feed stock ingots 156 are elongated and have a rectangular cross section as best seen in FIGS. 7 and 15. The feed stock ingots 156 may be of any convenient size and with any suitable end configuration. For instance, in one form the ingots are provided with a V-shaped groove 170 at the leading end, i.e., the end first introduced to the atmospheric control housing 120, and a mating point 172 at the trailing end, so that successive ingots will intermesh substantially as shown in FIG. 15. As the feed stock ingots 156 are fed into the atmospheric control housing 120 through the resilient plates 148 by a feed mechanism which will presently be described in detail, the feed stock ingots 156 are very securely held within the chamber 140 by three spring biased dogs 174, 176 and 178.

The dog 174 is disposed between the top plate 142 of the chamber 140 and the top edge of the feed stock ingot 156, and biases the ingot downwardly against the bottom plate 144. An alignment pin 180 is threaded through the top plate 142 and extends into a bore 182 in the dog 174. This construction permits relative movement of the dog 174 in the vertical direction while securing the dog 174 against horizontal movement, when referring to FIG. 5. A pair of springs 184 and 186 are disposed between the plate 142 and the dog 174 to bias the dog 174 downwardly against the top edge of the feed stock ingot 156. The force of the springs 184 and 186 can be adjusted by Allen screws 188 and 190 which are threaded through the plate 142, and the dog 174 can be withdrawn from the path of the feed stock ingot to permit initial insertion of the ingot.

The dog 176 biases the feed stock ingot 156 against the front support plate 14. Four alignment pins 192 are threaded into the rear face of the front plate 146 and pass through a spacer plate 194, which may be securely connected to the plate 146, and into bores in the dog 176 so as to prevent displacement of the dog 176 in the direction the feed stock ingot is moved. Six springs 196 are disposed between the spacer plate 194 and the dog 176 and continually bias the dog 176 against the feed stock ingot 156. The compressive force or biasing force of each of the springs 196 can be adjusted by Allen screws 198 and the dog 176 can be withdrawn from the path of the ingot 156 to permit its initial insertion.

The dog 178 is retained in place by two guide pins 200 which can be seen in FIG. 1, and is biased against the feed stock ingot 156 by three springs 202 (only one of which is shown in FIG. 6) the compression of which can be adjusted by three Allen screws 204. Of course, the dog 176 also biases the feed stock ingot against the upright support plate 14 and in combination with the dog 174 and the bottom plate 144 securely retain the ingot 156 in place as the leading end thereof is cut away by the cutting element 22, as will hereafter be described in greater detail. The purpose of the dog 176 is primarily to retain the trailing end 172 of each feed stock ingot 156 as long as possible, as will hereafter be described in greater detail.

The feed stock ingots 156 are initially supported by a rail 209 which is connected to the front support plate 14 and is disposed at the same height as the bottom plate 144 of the chamber 140. The feed stock ingots 156 are fed through the chamber 140 and into the path of the cutting element 22, which may be considered as the comminuting zone, by a feed mechanism indicated generally by the reference numeral 210. The feed mechanism 210 comprises a pair of right-triangularly shaped support plates 212 and 214 which are welded to stringer plates 216 and 218, respectively, and to web plates 220 and 222, respectively, to form two integral structures. The stringer plates 216 and 218 are disposed in abutting relationship to the front upright plate 14 and may be welded, bolted or otherwise connected thereto, so that the triangular plates 212 and 214 are horizontally disposed in spaced, parallel relationship, normal to the upright support plate 14. A journal block 224 is connected to the web plate 220 and to the corner of the triangular plate 212 which is remote from the upright support plate 14. A similar journal block 226 is connected to the corner of the triangular plate 214 and to the end of the web plate 222. An arm plate 228 is disposed on edge and connected to a hinge body 230 having a vertical bore which is disposed between the journal blocks 224 and 226 as best seen in FIG. 8. A pin 232 may then be inserted through bores in the journal block 226, the hinge body 230 and the journal block 224 so that the arm plate 228 is free to oscillate about a vertical axis coinciding with the pin 232.

The arm plate 228 extends through the aperture 152 in the upright support plate 14 and has upper and lower stiffening flange plates 234 and 236, respectively, welded along the top and bottom edges, respectively. The arm plate 228 has an aperture 238, which can best be seen in FIG. 9, through which the feed stock ingot 156 passes. The feed stock ingot 156 is gripped between a front jaw member 240 and a rear jaw member 242. The front jaw member 240 is generally rectangular in shape, as can be seen in FIG. 1, and preferably has an upturned side flange 244 and a downturned side flange 246 which are disposed adjacent guide rods 248 and 250, respectively, which are connected to the arm plate 228 and project from the plate 228 as can best be seen in FIG. 8. The guide rods 248 and 250 are disposed adjacent the top side 252 and lower side 254 of the front jaw member 240 so as to limit movement of the jaw member 240 to the horizontal plane relative to the arm plate 228. The front jaw member 240 is connected by a ball and socket joint 256 to an arm 258 which is pivotally connected to a block 260 which in turn is connected to the arm plate 228. The arm 258 is preferably provided with thread means for adjusting the length of the arm.

The rear jaw member 242 also has an upturned flange 262 and a downturned flange 264 which are disposed adjacent guide rods 266 and 268, respectively, which project from the arm plate 228. The guide rods 266 and 268 are positioned adjacent the top and bottom edges of the rear jaw member 242 to limit movement of the jaw member to the horizontal plane. The jaw member 242 is also connected by a ball and socket joint 270 to an adjustable length arm 272 which is pivotally connected to a block 274, which in turn is connected to the arm plate 228.

The cylinder 276 of a hydraulic linear actuator 278 is pivotally connected by a bracket 280 to the front support plate 14. The piston rod 282 of the linear actuator 278 is pivotally connected by a pin 284 and bracket 286 to the arm plate 228. Thus when hydraulic fluid is introduced through the conduit 288 to the rear head end of the linear actuator 278, the arm member 228 will be pivoted counterclockwise about the journal pin 232, when referring to FIG. 8. When hydraulic fluid is introduced through the conduit 290, the arm member 228 will be pivoted clockwise about the journal pin 232. As the arm plate 228 is pivoted counterclockwise by introduction of fluid to the conduit 288, the arms 258 and 272 will tend to pivot toward the arm plate 228 and will wedge the jaw members 240 and 242 against and tightly grip the feed stock ingot 156. At the same time, the feed stock ingot 156 will be moved in the direction in which the arm plate 228 is pivoted, and therefore will be forced past the dogs 174, 176 and 178 into the path of the cutting element 22. Of course, when the arm plate 228 is rotated counterclockwise the arms 258 and 272 will pivot away from the arm plate 228 and loosen the grip of the jaw members 240 and 242 so that the dogs 174, 176 and 178 will secure the feed stock ingot 156 in the advanced position and prevent withdrawal.

The length of stroke of the arm plate 228 and therefore the distance the feed stock ingot 156 is advanced during each stroke can be adjustably controlled by a bolt 292 positioned to engage and arrest the motion of the arm plate 228. The bolt 292 may be threaded into a bracket arm 294 which in turn may be connected to the plate 146 of the chamber 140. A coil spring 296 is disposed between the jaw member 240 and a bracket arm 298 which is connected to the bracket arm 294. A similar spring 300 is disposed between the jaw member 242 and a downwardly extending portion 302 of the front support plate 14, as can best be seen in FIGS. 1 and 8. The springs 296 and 300 continually urge the jaw members 240 and 242 rearwardly, and by reason of pivot arms 258 and 272, against the feed stock ingot 156 to insure uniform operation of the feed mechanism.

Figure 13:
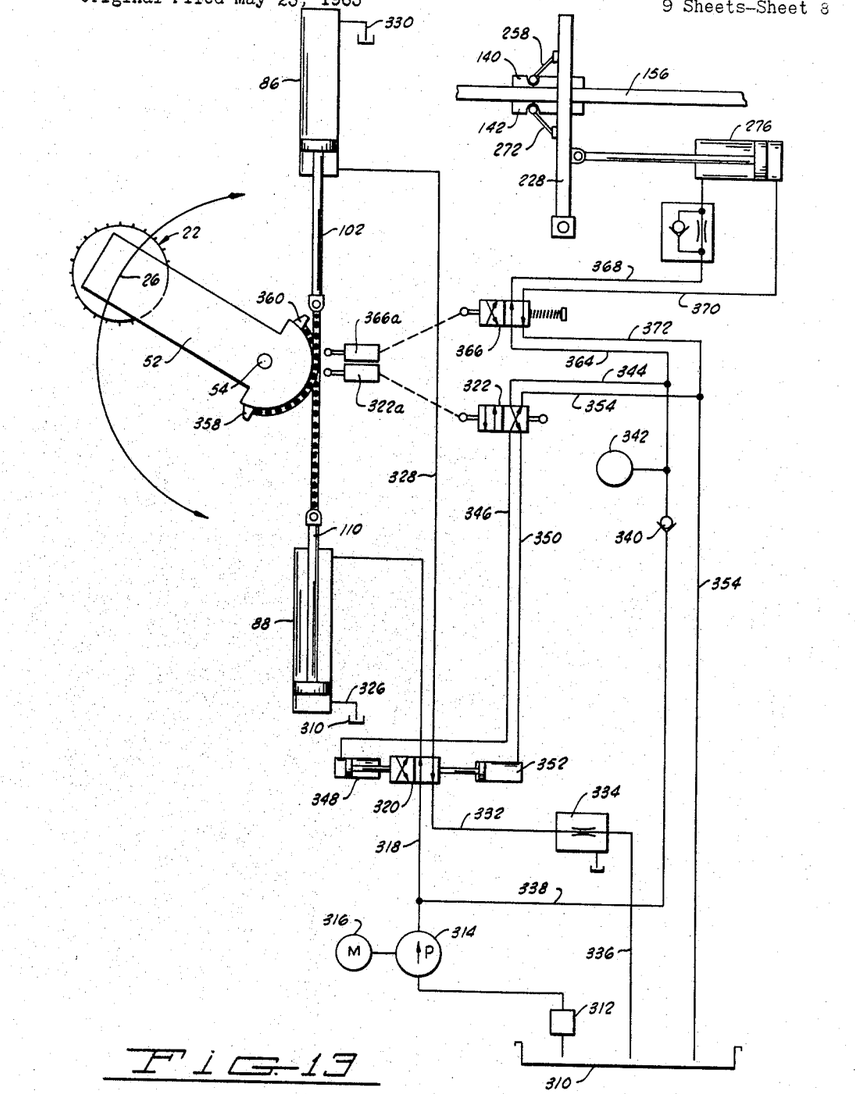
FIG. 13 is a schematic drawing of the hydraulic system of the comminuting machine of FIG. 1.

The hydraulic system for oscillating the arm member 52 and actuating the feed mechanism 210 is illustrated schematically in FIG. 13. A supply tank or sump 310 may be formed in the base member 12, as previously described. Hydraulic fluid is taken from the sump 310 through a strainer 312 by means of a pump 314 which is driven by an electric motor 316. The motor 316 may be located at any convenient point on the base member 12, substantially as shown in FIGS. 3–5, but for convenience of illustration the hydraulic fluid conduits of the system are not illustrated except schematically in FIG. 13. The pump 314 is preferably of the constant pressure type and pumps fluid under pressure through an inlet conduit 318 to a four-way valve 320. The four-way valve 320 is hydraulically actuated by a pilot valve 322, as will hereafter be described in greater detail. A conduit 324 connects an outlet of the four-way valve 320 to the rod end of the hydraulic cylinder 88. The head end of the cylinder 88 is connected to the sump 310 by a conduit 326, the sump 310 being represented by the conventional symbol. Another conduit 328 connects the other outlet of the four-way valve 320 to the rod end of the hydraulic cylinder 86. The head end of the cylinder 86 is also connected to the sump 310 by a conduit 330. A return flow conduit 332 from the four-way valve 320 is passed through a variable restrictive orifice means 334, for controlling the speed of oscillation of the arm member 52, as hereafter described, and finally through conduit 336 back to the sump 310.

Hydraulic fluid from the pump 314 is also passed through a conduit 338 and through a check valve 340 to an accumulator tank 342. Hydraulic fluid passing through the check valve 340 and from the accumulator tank 342 is passed by a conduit 344 to the input of a four-way pilot valve 322. A conduit 346 connects one outlet of the pilot valve 322 to one actuating pilot cylinder 348 of the four-way valve 320. Another conduit 350 connects the other outlet of the pilot valve 322 to the other pilot cylinder 352 of the four-way valve 320. A return flow conduit 354 from the pilot valve 322 returns fluid to the sump 310.

The pilot valve 322 is mechanically shifted between its two operating positions by a suitable mechanical actuating means 322a which is supported by a bracket 323 (see FIG. 4) and is actuated by cam means 358 and 360 on the arm member 52. The cam means 358 and 360 can be seen in FIG. 3, as well as FIG. 13. The pilot valve 322 remains in either position until mechanically shifted by the cams and is shifted into the position illustrated in FIG. 13 when contacted by the cam 360, and is shifted into the other position when contacted by the cam 358 so as to cause reciprocation of the arm member 52, as will presently be described in detail.

Hydraulic fluid which has passed through the check valve 340 also passes through the conduit 364 to the input of four-way ingot feed control valve 366 which is physically located adjacent the pilot valve mechanism 322a on the bracket 323. The ingot feed control valve 366 is spring biased into the position illustrated in FIG. 13, and is mechanically biased into the other position when contacted by the cams 367 at both the top of the upstroke and the bottom of the downstroke, as will hereafter be described in greater detail. A conduit 368 connects one outlet from the ingot feed control valve 366 to the rod end of the hydraulic cylinder 276 of the linear actuator 278 and another conduit 370 connects the ingot feed control valve 366 to the head end of the cylinder 276. A return flow conduit 372 connects the valve 366 to the return flow conduit 354 for returning hydraulic fluid to the sump 310.

A liquid spray nozzle means 374 is positioned to direct a stream of fluid at the contact point between the rotating cutting element 22 and the feed stock ingot 156 to both cool and lubricate the two members. The spray nozzle means 374 may conveniently be fabricated from a short length of tubing flatttened at the end and connected by a connector 376 to an adapter L 378 which extends through an aperture in the sealing plate 122 and is threaded into the front end of a fluid passageway extending through a block 380. The block 380 is connected to the arm member 52, as can best be seen in FIGS. 2 and 4. The block 380 is not illustrated in FIG. 3 so that the sprocket means 106 and 114 can be seen. A flexible hose conduit 382 is connected to the rear end of the passageway through the block 380 and is connected by a suitable union 384 to a rigid conduit 386 connected to the base member 12 or other rigid structure.

Figure 14:
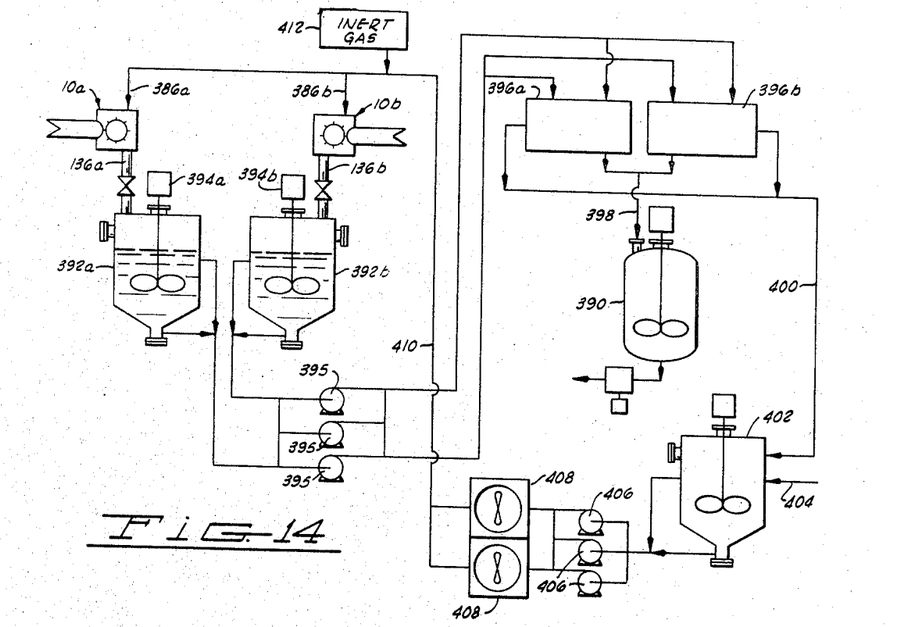
FIG. 14 is a schematic diagram of a system constructed in accordance with the present invention for comminuting aluminum or other reactive metal and transporting the comminuted material to a reaction vessel under a controlled environment.

Referring now to FIG. 14, a dual process system constructed in accordance with the present invention is indicated generally by the reference numeral 388. The system 388 may be provided with dual components in all cases except for a reaction vessel 390, and accordingly the dual components will be designated with the subscripts "a" and "b." Two comminuting machines 10a and 10b as previously described are connected by conduits 136a and 136b to slurry vessels 392a and 392b which are continually agitated by suitable agitating means 394a and 394b, respectively. The aluminum chip slurry which will presently be described can be pumped from either of the slurry vessels 392a or 392b by any one of three pumps 395 to either one of two liquid-solid separating devices, such as shaker screens 396a and 396b which separate the chips from the fluid. The chips are directed through the conduit 398 to the reaction vessel 390. The liquid is passed through the conduit 400 to another slurry vessel 402 which is provided with a conduit means 404 for introducing additional liquid. The essentially chip free liquid from the slurry vessel 402 is pumped by any one of three pumps 406 to either one of two heat exchangers 408a and 408b. From there the liquid is returned by conduit 410 to the conduits 386a and 386b of the comminuting machines 10a and 10b, respectively. An inert gas is introduced under pressure to the conduit 410 in order to purge the atmospheric control housing 120 of air and to maintain an inert atmosphere around the cutting member 22 and the end of the feed stock ingot 156.

*Operation*

After the comminuting machine 10 has been completely assembled as illustrated, and before the hydraulic pump motor 316 or the electric motor 60 have been actuated, a feed stock ingot 156 is positioned on the guide rail 209 and passed between the jaw members 240 and 242. The ingot 156 can easily be passed between the jaw members 240 and 242 because the hydraulic linear actuator 278 is not charged with pressure. The dogs 174, 176 and 178 should be withdrawn from the path of the ingot by adjusting the respective Allen screws which adjust the bias of the several springs. The ingot 156 can then easily be passed through the apertures in the resilient sealing strips 148 and between the dogs and the plates 14 and 244. Then the Allen screws are tightened to apply the desired clamping force to the ingot 156. Of course, it will be appreciated that this procedure is necessary only for the first ingot, since subsequent ingots will be automatically and continuously fed into the comminuting zone, as will hereafter be described in greater detail.

Next the pumps 406 are started so that the scavenger fluid, which may be either kerosene or one of the liquid reagents used in the process being carried out in the reaction vessel 390, is pumped through the conduits 382 so as to be sprayed from the nozzle 374, and the electric motor 60 and electric pump motor 316 started. Hydraulic fluid from the pump 314 will then be routed through conduit 318 to the control valve 320, through conduit 338, check valve 340 and conduit 344 to pilot valve 322, and through conduit 364 to ingot feed control valve 366. Assuming for the moment that the arm member 52 is at an intermediate position so that the ingot feed control valve 366 is in the spring biased position illustrated in FIG. 13. Hydraulic fluid will then be passed through the conduit 368 to the rod end of the linear actuator 278 and the arm plate 228 will be moved to the rearward position with respect to the direction of ingot feed and will then be in position for a forward or feed stroke, as will presently be described.

Assuming that the valve 322 and control valve 320 are in the position illustrated in FIG. 13, hydraulic fluid will then be passed through the conduit 324 to the rod end of the lower hydraulic cylinder 88 such that the piston rod 102 will be moved downwardly and the arm member 52 and cutting element 22 pivoted through an upstroke. At the same time, hydraulic fluid will be returned from the cylinder 86 through the conduit 328, control valve 320, conduit 332, restrictive orifice means 334 and conduit 336 to the sump 310. Of course, the setting of the restrictive orifice means 334 will control the rate at which the arm member 52 will be pivoted and oscillated. When the arm member 52 reaches the top of the upstroke, the cam 360 will first contact the cam actuator 322a which will shift the valve 322 from the position illustrated in FIG. 13 so that high pressure fluid from the accumulator tank 342 and conduit 344 will be routed to a pilot cylinder and thereby shift the control valve 320. When the control valve 320 is shifted from the position shown in FIG. 13, high pressure hydraulic fluid from the pump 314 will be directed through conduit 328 to the rod end of the upper hydraulic cylinder 86 and the upper piston rod 102 will be moved upwardly thereby pivoting the arm member 52 counterclockwise as shown in FIG. 13 and moving the cutting element 22 through a downstroke.

However, at substantially the same moment that the cam 360 contacts the actuating means 322a, the cam means 367 will contact the actuating means 366a and mechancally shift the spring biased feed control valve 366 into the position other than that shown, such that high pressure fluid will be directed from the conduit 364 to the conduit 370 and then to the head end of the hydraulic cylinder 276. This will immediately move the arm plate 228 forward so that the jaw members 240 and 242 will grip and advance the feed stock ingot 156 a fraction of an inch, as determined by the adjustment of bolt 292, toward the arcuate path of the cutting element 22. As soon as the arm member 52 has moved through the downstroke a sufficient distance for the cam means 367 to release the actuating means 366a, the ingot feed control valve 366 will automatically be shifted by the spring back to the position illustrated in FIG. 13. High pressure hydraulic fluid will again be routed through the conduit 368 to the rod end of the hydraulic cylinder 276 and will withdraw the arm plate 228 and the jaws 240 and 242 in preparation for the next feed stroke. During the return stroke the jaws will not grip the feed stock ingot 156 which will be securely held in the advanced position by the dogs 174, 176 and 178.

When the arm member 52 completes the downstroke, the cam 358 will again engage the pilot valve actuating means 322a so as to shift the pilot valve 322 back to the position shown in FIG. 13. High pressure fluid will then be directed through the conduit 350 to the pilot cylinder 352 and will shift the control valve 320 back to the position illustrated in FIG. 13. This will again introduce high pressure fluid to the lower cylinder 88 which will move the piston rod 110 downwardly and cause the arm member 52 and cutting element 22 to move through an upstroke. At the same time, another cam means 369 (see FIG. 3) which is positioned behind the cam means 358 in FIG. 13 will engage the feed valve actuating means 366a and mechanically shift the feed control valve 366 to the position not shown in FIG. 13. High pressure fluid will again be directed through conduit 370 to the head end of the cylinder 276 and thereby advance the feed stock ingot 156 a short distance toward the arcuate path of the cutting element 22. Thus it will be noted that the ingot 156 is advanced after both the upstroke and the downstroke of the cutting element 22.

It will be appreciated that it may be necessary to oscillate the cutting element 22 a number of times before the feed stock ingot 156 is advanced by the feed mechanism 210 sufficiently far to enter the path of the cutting element 22. However, as the feed stock ingot 156 is moved into the path of the cutting element 22, the ingot 156 will be cut along an arcuate path to produce a round end 156a, as illustrated in FIG. 5. Since the cutting element 22 is rotated in the direction of the arrow 22a and the axis of rotation 26 is simultaneously translated through an upstroke represented by the arrow 26a, or a downstroke represented by the arrow 26b, it will be evident that each of the cutter blades 28 or 44, as the case may be, of the cutting element 22 will describe an arc which will intersect the round end 156a of the ingot 156 and provide a complete cutting action.

It will be evident that the size of the chips cut in this manner will be a function of the width of the teeth 40a and 40b, or 46a and 46b, as the case may be, the circumferential spacing of the teeth, the diameter of the cutting element 22, the distance from the center of oscillation 54 to the axis of rotation 26, the speed of rotation of the cutting element 22, and the distance the feed stock ingot 156 is advanced prior to each stroke of the cutting element 22. Thus uniform particle sizes in the general range from 0.050–2.000 inches in width, 0.0005–0.10 inch in thickness, and 0.100–0.500 inch in length can be produced by changing the various parameters mentioned above. The individual cutting blades 28 of the cutting element 22 should be circumferentially spaced a sufficient distance that metal particles will not lodge between the blades. Generally, spacing of from 0.5 to 4.0 blades per linear inch of cutter wheel circumference can be used, and preferably the blades should be spaced from 1.8 to 2.8 cutter blades per linear inch of cutting element circumference. The rotational speed of the cutting element can be varied so as to obtain linear velocities of 500–20,000 feet per minute and in each instance will normally be selected in accordance with the solid stock material being comminuted. For aluminum a linear velocity of from 2,000 to 15,000 feet per minute is suitable. Using an eight inch diameter cutting element, a cutting blade speed of 10,000 feet per minute, and a stroke time of one second, particles having a width of 0.167 inch, a thickness of 0.002 inch, and a length of 0.125 inch have been attained from solid aluminum stock.

Referring now to FIG. 15, the feed stock ingots 156 previously described are provided with a V-shaped groove 170 at one end and a correspondingly tapered point 172 at the other end. The grooved end 170 of the ingots is fed into the path of the cutting element 22. As the rear, or pointed end 172, of the ingot 156 approaches the feed mechanism 210, another ingot 156 is placed in the position on the support rail 209 with the grooved end 170 around the pointed end 172 of the preceding ingot, as illustrated in FIG. 15. As soon as the jaw members 240 and 242 engage a portion of the second ingot 156, it will then be used to push the preceding ingot 156 into the path of the cutting element 22. The dovetailed interlock formed by the tapered and grooved ends of the ingots 156 will pass easily through the dogs 174, 176 and 178. The primary purpose of the dog 178 is to hold the pointed rear end 172 of the ingot as long as possible. Thus it will be appreciated that as the ingots are cut along the dotted line 499 in FIG. 15, for example, the remaining portion of the pointed end 172 will be securely held by the combined forces of the dog 178 and the abutting sides of the grooved end 170 of the next succeeding ingot 156. Thus each feed stock ingot 156 can be substantially consumed by the cutting element 22 and the final tip of the point 172 can be dropped through the funnel portion 132 and into the conduit 136 where it can be collected in a screen or other suitable trap (not illustrated).

An inert liquid with respect to the material being comminuted, such as kerosene or one of the liquid reagents used in the chemical process when aluminum is being comminuted, is pumped through the conduit 386, through the flexible hose 382, and finally through the nozzle 374 which continuously sprays the liquid directly at the point of comminution so as to contact both the periphery of the cutting element 22 and the round end 156a of the feed stock ingot 156. The liquid from the nozzle 374 serves the function of cooling both the cutting element 22 and the ingot 156, as well as flushing the chips or flakes cut from the ingot away from the cutting element 22. Further, the chips are immediately entrained in the liquid and passed downwardly through the funnel means 132 into the conduit 136. At the same time, the inert gas, such as nitrogen, at greater than atmospheric pressure is introduced to the conduit 410 from the tank 412 and is ultimately introduced to the atmospheric control housing 120 by the nozzle 374. By maintaining the inert gas in the atmospheric control housing 120 at greater than atmospheric pressure all air and of course oxygen will be purged from the comminuting zone. It will be appreciated that the atmospheric control housing 120 need not be completely airtight but should be as near airtight as possible to reduce the quantity of inert gas required to maintain the housing 120 under slightly greater than atmospheric pressure.

The entrained chips pass through the conduit 136 into one of the slurry vessels 392 and are then transported by one of the pumps 395 to one of the shaker screens 396. The shaker screen then separates the chips from the entraining liquid and the particles are dropped downwardly or otherwise mechanically transported into the reaction vessel 390. The entraining liquid, together with any particles which might still be contained therein, pass through the conduit 400 to another slurry vessel 402, which is agitated to prevent minute particles which may pass through the screen 396 from settling out. Additional liquid may conveniently be introduced through the conduit 404 at this stage. The pumps 406 then recycle the liquid through the heat exchangers 408 back to the conduit 386 and then to the spray nozzle 374. Thus it will be appreciated that a completely closed, controlled atmosphere system for both comminuting the solid stock and transporting the cut chips to a reaction vessel has been described.

Figure 16:
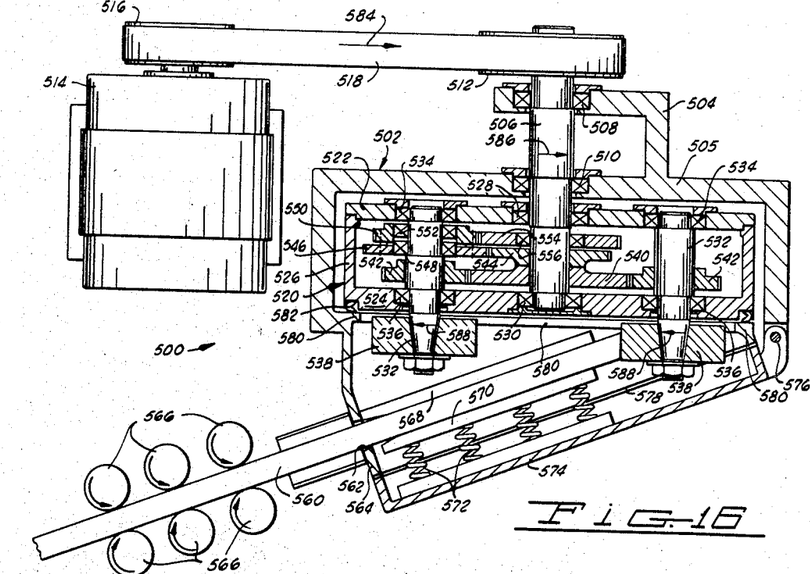
FIG. 16 is a simplified plan view in section of another comminuting machine constructed in accordance with the present invention.
Figure 17:
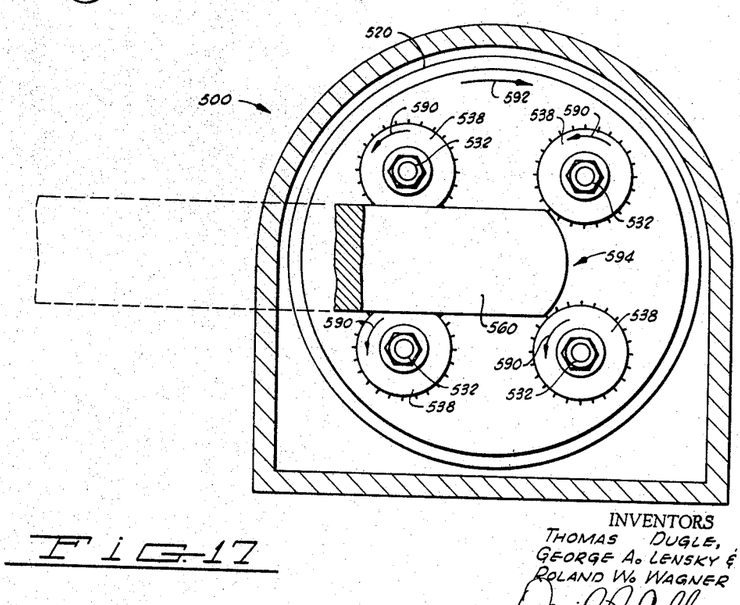
FIG. 17 is a schematic front elevation of the comminuting machine of FIG. 16.

*Embodiment shown in FIGS. 16 and 17*

Another comminuting machine constructed in accordance with the present invention is indicated generally by the reference numeral 500 and is illustrated in FIGS. 16 and 17. The comminuting machine 500 is comprised of a support housing 502 having a bearing support bracket 504 connected to and spaced from the rear wall 505. A drive shaft 506 is journalled by bearings 508 and 510 in the bearing support bracket 504 and the rear wall of the support housing 502, respectively. A sheave 512 is splined to the drive shaft 506 and is driven by an electric motor 514 through a drive sheave 516 and a drive belt 518.

A planetary housing 520 is disposed within the support housing 502 and has a rear wall 522, a front wall 524, and a cylindrical side wall 526. The planetary housing 520 is rotatably supported on the drive shaft 506 by bearings 528 and 530, which are connected to the rear wall 522 and front wall 524, respectively. Thus it will be noted that the planetary housing 520 is free to rotate within the support housing 502 and that the drive shaft 506 is free to rotate with respect to both the support housing 502 and the planetary housing 520, except for a differential gearing arrangement, as will hereafter be described in greater detail.

Four cutter element shafts, each designated by the reference numeral 532, are journalled in the rear wall 522 and front wall 524 of the planetary housing 520 by bearings 534 and 536, respectively. The four cutting element shafts 532 are equally spaced around the circular planetary housing 520 substantially as shown in FIG. 17. A disc-shaped cutting element 538 is splined on each of the cutting element shafts 532. The cutting elements 538 are of substantially the same size and may be constructed substantially identical to the cutting element 22 of the comminuting machine 10, except that for the same size ingot the disc-shaped body and blades are preferably slightly thicker and longer, respectively, in order to compensate for the angle at which the ingot is fed, as will hereafter be described in greater detail. The four cutting element shafts 532 are rotated by a planetary gearing arrangement comprising a relatively large sun gear 540 which is splined to the drive shaft 506 and meshes with the four smaller planet gears 542, each of which is splined to a cutting element shaft 532, only two of which are illustrated in FIG. 16. Thus as the drive shaft 506 is rotated by the drive motor 514, all four of the cutting elements 538 will be rotated at substantially the same speed through the sun gear 540 and the respective planetary gears 542.

The planetary housing 520, and therefore the four cutting elements 538 are rotated about the drive shaft 506 by means of a differential gearing arrangement comprised of a gear 544 which is splined to the drive shaft 506, a gear 546 which is journaled on one of the cutter element shafts 532 by a bearing 548, a gear 550 which is rigidly connected to the gear 546 and is also journaled on the cutter element shaft 532 by a bearing 552, and a gear 554 is journaled on the drive shaft 506 by a bearing 556. It will be noted that the gear 544 is smaller than the gear 554 so as to provide a speed differential between gear 544 and gear 554 in order to cause progression of the planetary housing 520 about the drive shaft 506, as will hereafter be described in greater detail.

Feed stock ingots 560 of substantially the same type as the feed stock ingots 156 previously described may be fed through an aperture 562 in the side wall 564 of the support housing 502 by a plurality of feed rollers 566 which may be driven by any suitable means (not illustrated). A guide plate 568 may be disposed within the support housing 502 and the feed stock 560 may be securely gripped between the guide plate 568 and a spring biased dog 570. The dog 570 may be biased by a plurality of springs 572 connected to a door 574 to the support housing 502. The door 574 may be supported by a hinge 576 and may be closed by a boomer-type latch (not illustrated) to both compress the springs 572 and compress a resilient seal 578 around the periphery of the door 574 to provide a substantially airtight enclosure.

A circular front flange 580 may be provided within the support housing 502 in front of the planetary housing 520. A circular, resilient seal 582 having a cross section substantially as shown may then be connected around the periphery of the front wall 524 of the planetary housing 520 and ride on the circular flange 580 as the planetary housing 520 rotates, in order to provide a complete seal so that the atmosphere within the comminution zone 594 can be controlled. It will be noted that the feed stock ingot 560 is fed into the plane of the rotating cutting elements 538 at an angle between the cutting elements, as best seen in FIG. 16.

Operation of embodiment of FIGS. 16 and 17

Assume now that the feed stock ingot 56Q is continually fed through the aperture 562 and between the guide plate 568 and spring biased dog 570 into substantially the position shown in FIG. 16. Assume also that the motor 514 drives the belt 518 in the direction of the arrow 584. The drive shaft 506 will then be driven in a clockwise direction, when referring to FIG. 17, which will be taken to be in the direction of the arrow 586 in FIG. 16. The cutting element shafts 532 will then be driven by the sun gear 540 and the planet gears 542 in the direction of the arrows 588 in FIG. 16 such that the cutting elements 538 will be driven in a counterclockwise direction, when referring to FIG. 17, as indicated by the arrows 590. At the same time, the planetary housing 520 and therefore the cutting elements 538 will be rotated at a much slower speed in the clockwise direction, as indicated by the arrows 592 in FIG. 17. This is accomplished by the differential speed gearing comprised of the gears 544, 546 and 554. It will readily be appreciated that the gear 554 will be driven at a slower speed than the gear 544 because it is of greater diameter. Since the drive shaft 506 and therefore the gear 544 are rotating in the clockwise direction, the gear 554 will also rotate in a clockwise direction but at a slower speed. Therefore, the gear 554 may be considered as rotating counterclockwise with respect to the gear 544, and since the gear 544 is the link to the power source it may be considered as stationary. The motion of the gear 554 will cause the gears 550 and 546 to have a relative clockwise rotation and, acting between the cutting element shafts 532 and the gear 544, will cause the planetary housing 520 to rotate around the shaft 506 in a clockwise direction relative to the support housing 502 and therefore relative to the ingot 560.

Therefore, the cutting elements 538 will be rotated at a relatively high speed and will simultaneously be moved through a circular path. The feed stock ingot 560 will be continuously moved to intersect the circular path of the cutting elements 538 in the comminution zone 594 and will be cut into small flakes in the manner previously described in connection with the comminuting machine 10. It will also be appreciated that a nozzle may be located to direct a cooling and cleaning liquid into the comminuting zone 594 and that means may be provided in the bottom of the support housing 502 for withdrawing the liquid and the entrained particles. Means may also be provided for introducing inert gas to the housing at greater than atmospheric pressure in order to prevent oxidation of the surfaces of the particles as the particles are cut.

From the above detailed description of several preferred embodimenst of the present invention, it will be appreciated that a novel and improved comminuting machine for cutting a pliable, solid material such as aluminum into a plurality of thin, flake-like particles having a high surface area-to-volume ratio has been described. The entire surfaces of the flakes are cut so that pliable metals such as aluminum can be comminuted. Having thus described several preferred embodiments of the present invention in detail, it is to be understood that various changes, substitutions and alterations can be made therein without departing from the spirit and scope of the invention as defined by the appended claims.

What is claimed is:

1. A comminution machine for cutting solid stock into thin chips having a high surface area-to-volume ratio, the machine comprising:
   a first support;

a main drive shaft journaled on the first support;
drive means operatively connected to the main drive shaft for rotating the main drive shaft;
a planetary housing journaled on the main drive shaft;
at least one cutting element shaft journaled on the planetary housing, each cutting element shaft being offset from and disposed parallel to the main drive shaft;
a sun gear splined to the main drive shaft;
a planet gear splined to each of the cutting element shafts and meshing with the sun gear and driven thereby;
a cutting element splined to each cutting element shaft, the cutting elements being disposed in a common plane; and,
differential gearing means for rotating the planetary housing about the main drive shaft,
whereby the cutting elements will be rotated about the cutting element shafts and will be rotated in a circular path in a common plane and solid stock moved into the circular path will be cut into a multitude of thin chips.

2. A comminution machine for cutting solid stock into thin chips having a high surface area-to-volume ratio as defined in claim 1 further characterized by:
feed means for feeding elongated ingots into the path of the cutting elements, the ingots being fed at an angle to the plane in which the cutting elements are rotated.

References Cited

UNITED STATES PATENTS

| | | | |
|---|---|---|---|
| 2,157,097 | 5/1939 | Jung | 29—187 |
| 2,812,573 | 11/1957 | May | 29—187 |
| 2,863,476 | 12/1958 | Clark | 241—280 |
| 3,066,878 | 12/1962 | Wildbolz | 241—277 |

WILLIAM W. DYER, JR., *Primary Examiner.*

HARRY F. PEPPER, JR., *Examiner.*